No. 712,878. Patented Nov. 4, 1902.
E. F. W. WIEDA.
CANDY DRIPPING MACHINE.
(Application filed Feb. 20, 1902.)
(No Model.) 2 Sheets—Sheet 1.
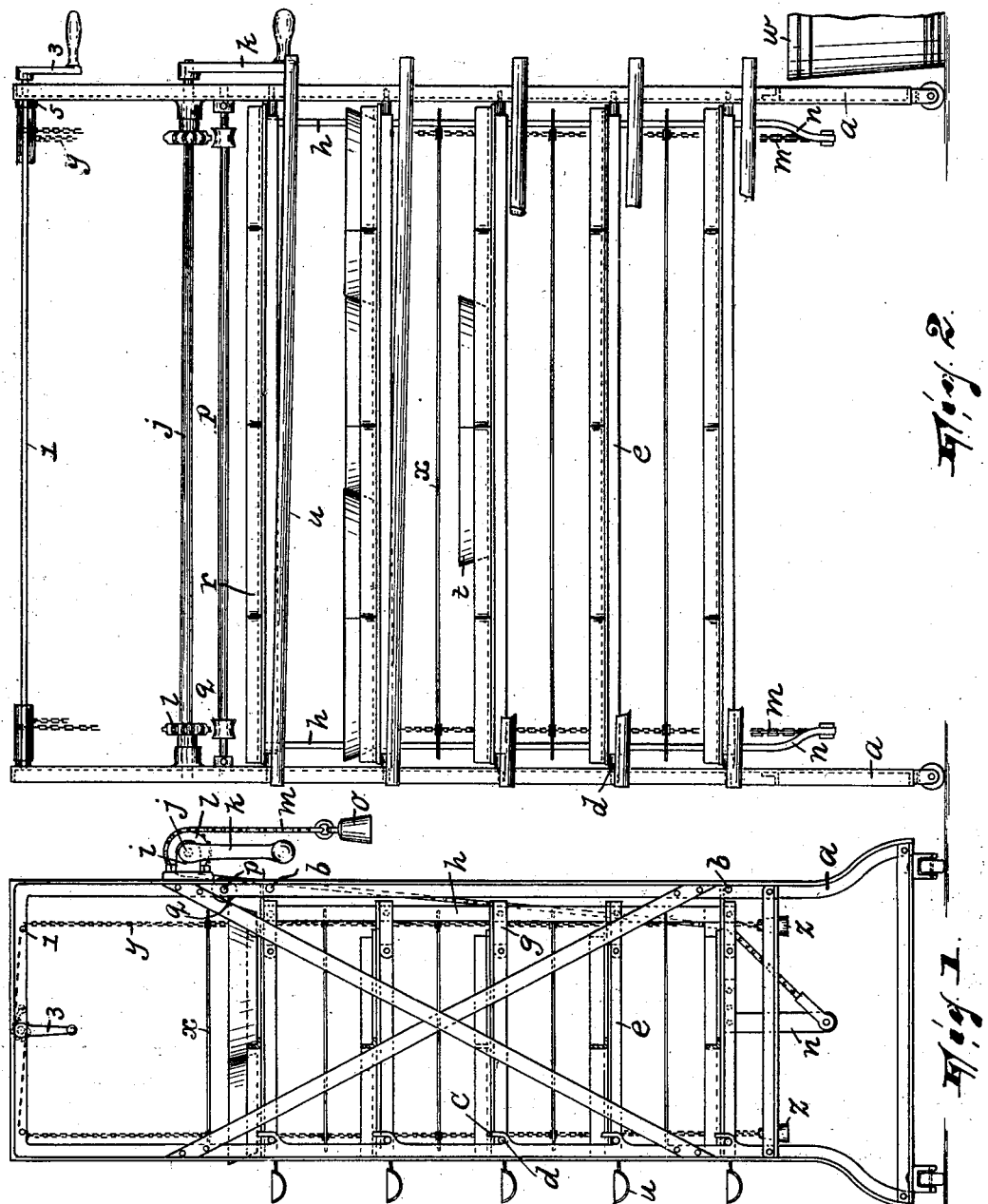
WITNESSES:
Wm D Bell
Robert J. Pollitt
INVENTOR
Ernst F. W. Wieda,
BY
Gartner & Steward,
ATTORNEYS

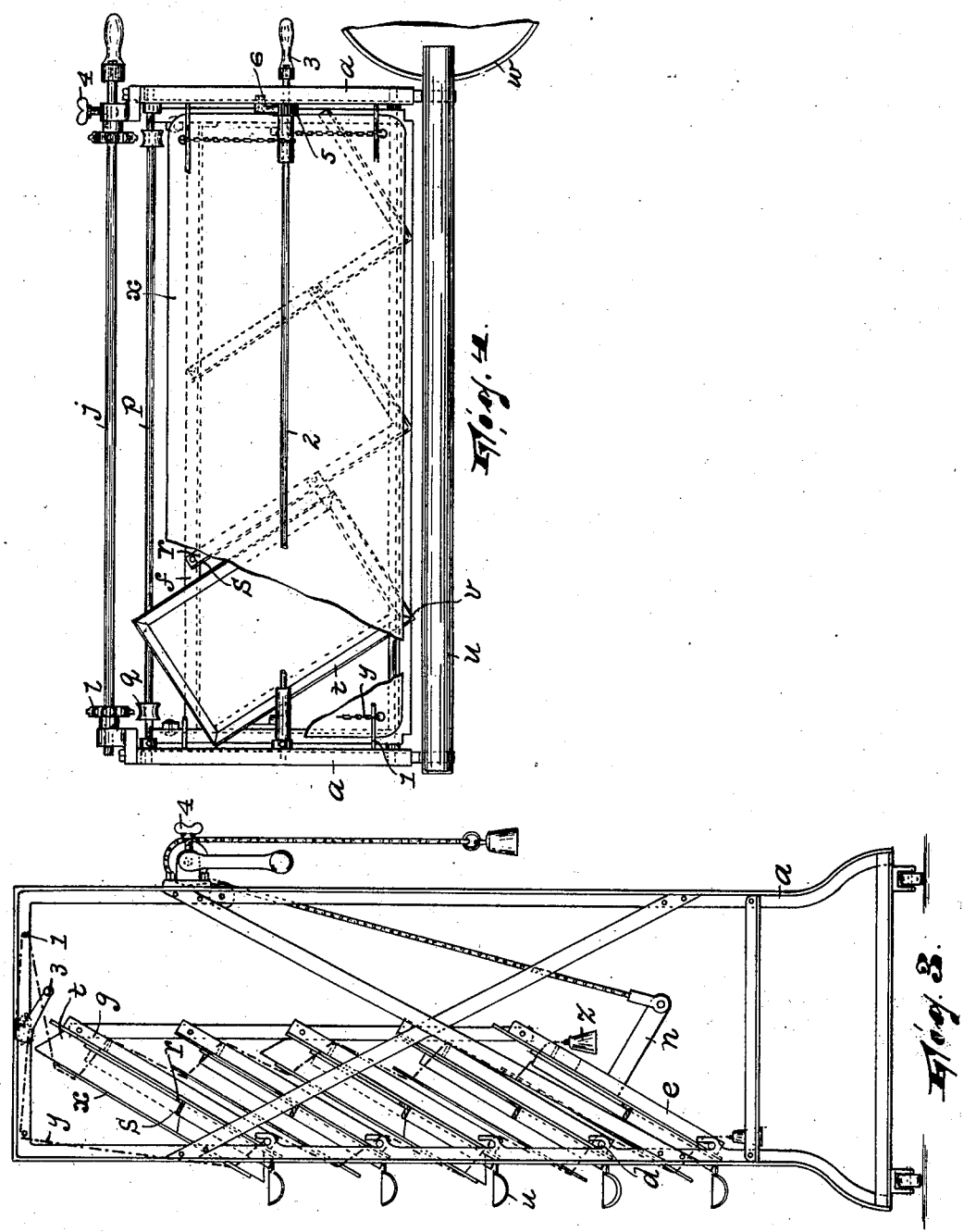

UNITED STATES PATENT OFFICE.

ERNST F. W. WIEDA, OF PATERSON, NEW JERSEY.

CANDY-DRIPPING MACHINE.

SPECIFICATION forming part of Letters Patent No. 712,878, dated November 4, 1902.

Application filed February 20, 1902. Serial No. 94,858. (No model.)

*To all whom it may concern:*

Be it known that I, ERNST F. W. WIEDA, a citizen of the United States, residing at Paterson, in the county of Passaic and State of New Jersey, have invented a new and useful Improvement in Candy-Dripping Machines, of which the following is a specification.

This invention relates to candy-making apparatus; and it has reference particularly to and consists in an apparatus designed to reduce to the minimum the expenditure of labor and time ordinarily required to drain off from the candy (particularly those varieties thereof which are provided with crystalline coatings) after it has been shaped and set aside in the crystallizing material to be thus subjected to the crystallizing effects thereof that portion of the crystallizing material which remains liquid.

My invention will be found fully illustrated in the accompanying drawings, wherein—

Figure 1 is an end view of the apparatus. Fig. 2 is a front view of said apparatus; Fig. 3, a view like Fig. 1, except that the pans for holding the material are shown as tilted; and Fig. 4 is a top plan view of said apparatus.

$a$ in said drawings represents two uprights, which by rods $b$ at the back of the machine and by other shafts hereinafter to be referred to are so braced as to form, with said rods, a substantially rectangular frame.

At regular intervals vertically the front portions of the uprights are formed with bearings $c$, in which rest shafts $d$, each of which carries a frame $e$, formed of a strip of angle-iron, which is bent around three sides of a rectangle and has its fourth side consisting of another bracing-strip of angle-iron $f$. (See Fig. 4.) At the back these several frames $e$ are pivotally connected in their projecting portions $g$ at each end to a common link $h$, extending vertically, one adjacent each upright of the machine.

In a bracket $i$, secured to the back of each upright $a$, is journaled a shaft $j$, carrying a crank $k$. On this shaft is secured a pair of sprocket-wheels $l$, over which passes a sprocket-chain $m$, being secured at one end to an arm $n$, extending downwardly from the lower frame $e$, passing back of its brace $f$. The free end of each chain carries a counterbalance $o$. On a shaft $p$, which connects the uprights $a$ at the back of the machine and near the shaft $j$ and which acts as one of the braces between the uprights, are journaled auxiliary guide-rollers $q$ for keeping the chains $m$ in place on the sprockets. On each frame $e$ is secured a series of rests $r$. These rests are preferably made of angle-iron and are L-shaped, one free end and the corner of each resting on the frame $e$, while its other free end seats on the next adjacent rest, except the other free end of the last one to the right, which also seats on the frame $e$. Where each rest has contact with the frame or its neighbor, it is preferably riveted in place.

It should be remarked that the flange portion $s$ of each rest extends upwardly and is on the side of the rest which is toward the front of the machine. Thus the rest is well adapted to support a pan or other similar receptacle $t$ in such manner that one corner of the pan is more advanced than the others, and also that the frame $e$ may be readily tilted without the pan sliding off. The front portions of the uprights $a$ are connected by a series of slightly-inclined troughs $u$, each arranged under the discharging-corners $v$ of the series of pans.

$w$ is simply a receptacle for receiving the drippings from the troughs.

It should be remarked that the uppermost and lowermost frame $e$ has support on the back of the rods $b$, and so they sustain the intermediate frames $e$.

It is preferable that each series of pans have a cover to keep the crystallized or hardened candy in the pan while the dripping is going on. $x$ therefore designates such covers, one being arranged over each series of pans and the entire series of covers being connected at their corners to four chains $y$, which carry weights $z$ at their lower ends to keep them in place on the pans and which, at their upper ends, pass up over rods 1, connecting the uprights, and are secured to a shaft 2, which is journaled in said uprights and carries at one end a crank 3. By turning the crank the series of covers may be elevated.

If desired, a set-screw 4, mounted in one of the brackets $i$ and taking against the shaft $j$, may be employed to secure the shaft against turning and so firmly maintain the pans at the incline to which they are adjusted. In order also to keep the shaft 2 from turning after the covers have been elevated, a ratchet 5 is arranged on the shaft, being adapted to be engaged by a pawl 6, pivoted on the frame.

It is thought that the operation will be understood without description further than that which has already been given.

Having thus fully described my invention, what I claim as new, and desire to secure by Letters Patent, is—

1. In a machine for draining candy materials and the like, the combination, with a suitable support, of frames pivoted in said support in superposed disposition, each frame being pivoted in one side portion thereof and adapted to seat on said support in the opposite side portion thereof, receptacles for the material to be drained arranged on said frames, a link connecting said frames, and means for tilting said frames in the support, substantially as described.

2. In a machine for draining candy materials and the like, the combination, with a suitable support, of a series of frames pivoted in said support in superposed disposition, each frame being pivoted in one of its side portions and one of said frames being adapted to seat on said support in a side portion thereof opposite to its pivotal portion, links connecting said frames, receptacles for the material to be drained arranged on said frames, and means for tilting the frames in the support, substantially as described.

3. The combination, with a suitable support, of a frame pivotally arranged in said support, means for tilting said frame in the support, and an L-shaped rest having a correspondingly-shaped flange formed around the outer edge thereof, said rest having its corner portion adjacent the pivot of said frame, substantially as described.

4. The combination, with a suitable support, of a frame pivotally arranged in said support, a receptacle having an angular side wall and arranged on said frame, one of the corner portions of said receptacle being adjacent the pivot of said frame, and means for elevating the frame to tilt the receptacle, substantially as described.

5. The combination, with a suitable support, of a series of frames pivoted in said support, a link connecting said frames, a series of substantially rectangular pans arranged on said frames, one corner of each being adjacent the pivotal portion of the corresponding frame, and means for elevating the frames to tilt the receptacle, substantially as described.

6. The combination of a suitable support, a series of superposed frames pivoted in said support, links connecting said frames, an arm projecting from one of said frames, means for tilting said frame operatively connected to said arm, and pans arranged on said frames, substantially as described.

7. The combination of a suitable support, a series of superposed receptacles pivotally arranged in said support, connecting means between said receptacles adapted to effect their simultaneous movement, means for tilting the receptacles, and superposed troughs arranged near the pivotal portions of said receptacles, substantially as described.

8. The combination of a suitable support, a series of superposed receptacles pivotally arranged in said support, means for simultaneously tilting said receptacles, covers for said receptacles, and means for simultaneously elevating said covers, substantially as described.

In witness whereof I have hereunto set my hand in presence of two witnesses.

ERNST F. W. WIEDA.

Witnesses:
JOHN W. STEWARD,
ROBERT J. POLLITT.